United States Patent
Marsanne et al.

[11] Patent Number: 5,884,044
[45] Date of Patent: Mar. 16, 1999

[54] DEDICATED DDC INTEGRABLE MULTIMODE COMMUNICATIONS CELL

[75] Inventors: Sébastien Marsanne, Grenoble; Maquin Francis, Fontaine, both of France

[73] Assignee: SGS-Thomson Microelectronics S.A., Saint Genis, France

[21] Appl. No.: 731,615

[22] Filed: Oct. 16, 1996

[30] Foreign Application Priority Data

Oct. 19, 1995 [FR] France .................................. 95 12474

[51] Int. Cl.⁶ ................................................ G06F 17/00
[52] U.S. Cl. ........................................................ 395/200.62
[58] Field of Search ............................. 395/800.39, 42, 395/43, 800.32, 834, 842, 868, 879, 880, 882, 883, 884, 200.42, 62, 67, 53, 54, 58, 200.6, 309, 310, 311, 831; 370/359; 340/825.5

[56] References Cited

U.S. PATENT DOCUMENTS

| | | | |
|---|---|---|---|
| 5,159,684 | 10/1992 | Kroll et al. | 395/500 |
| 5,376,928 | 12/1994 | Testin | 340/825.5 |
| 5,430,847 | 7/1995 | Bradley et al. | 395/310 |
| 5,617,553 | 4/1997 | Minagawa et al. | 711/206 |
| 5,666,559 | 9/1997 | Wisor et al. | 395/852 |

FOREIGN PATENT DOCUMENTS

A-0 708 399  4/1996  European Pat. Off. .......... G06F 3/14

OTHER PUBLICATIONS

French Search Report from French Patent Application 95 12474, filed Oct. 19,1995.
EDN–Electrical Design News, vol. 38, No. 16, Aug. 5, 1993, Newton, MA. US, pp. 119–122, R.Weiss "8–bit uPD 780xxx Combines uC with 12C bus".
Nec Res. & Develop., vol. 32, No. 3, Jul. 1991, pp. 350–360. Tetsuro Kanai, et al. "A 16–bit Microcomputer uPD70423 for Serial Communication".

*Primary Examiner*—Ellis B. Ramirez
*Attorney, Agent, or Firm*—Wolf, Greenfield & Sacks, P.C.

[57] ABSTRACT

A cell of an integrated circuit dedicated to a microprocessor, the cell comprising a data input/output circuit connected to a communications network working according to at least two different protocols called the DDC1 and I2C protocols and a control circuit provided with a sequencer, the control circuit being managed by the sequencer, the control circuit communicating with a control bus of the microprocessor and with the data input/output circuit; wherein the cell comprises a logic circuit which enforces the state of the sequencer as a function of an information element which identifies which of said protocols is being used.

34 Claims, 4 Drawing Sheets

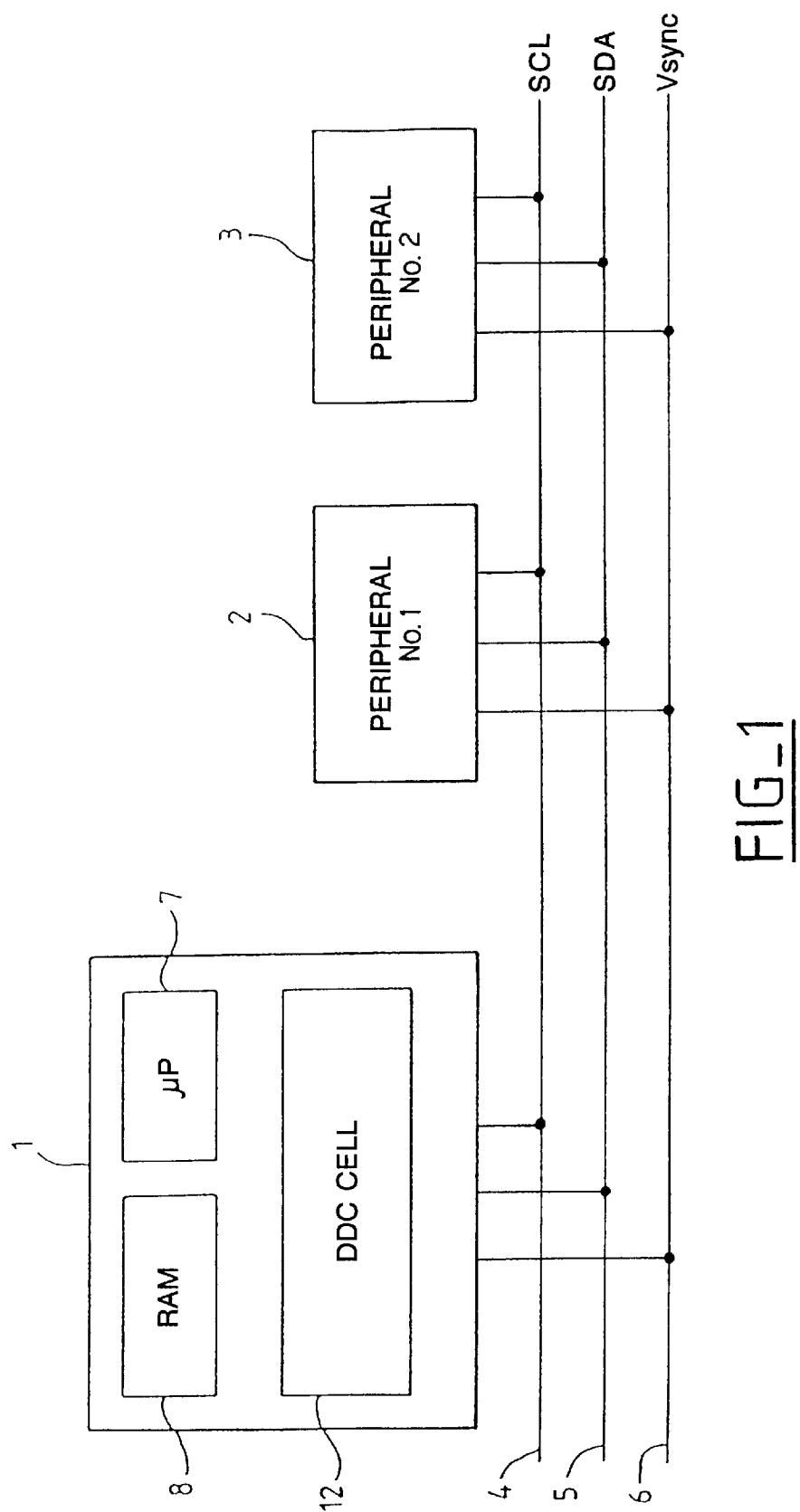
FIG_1

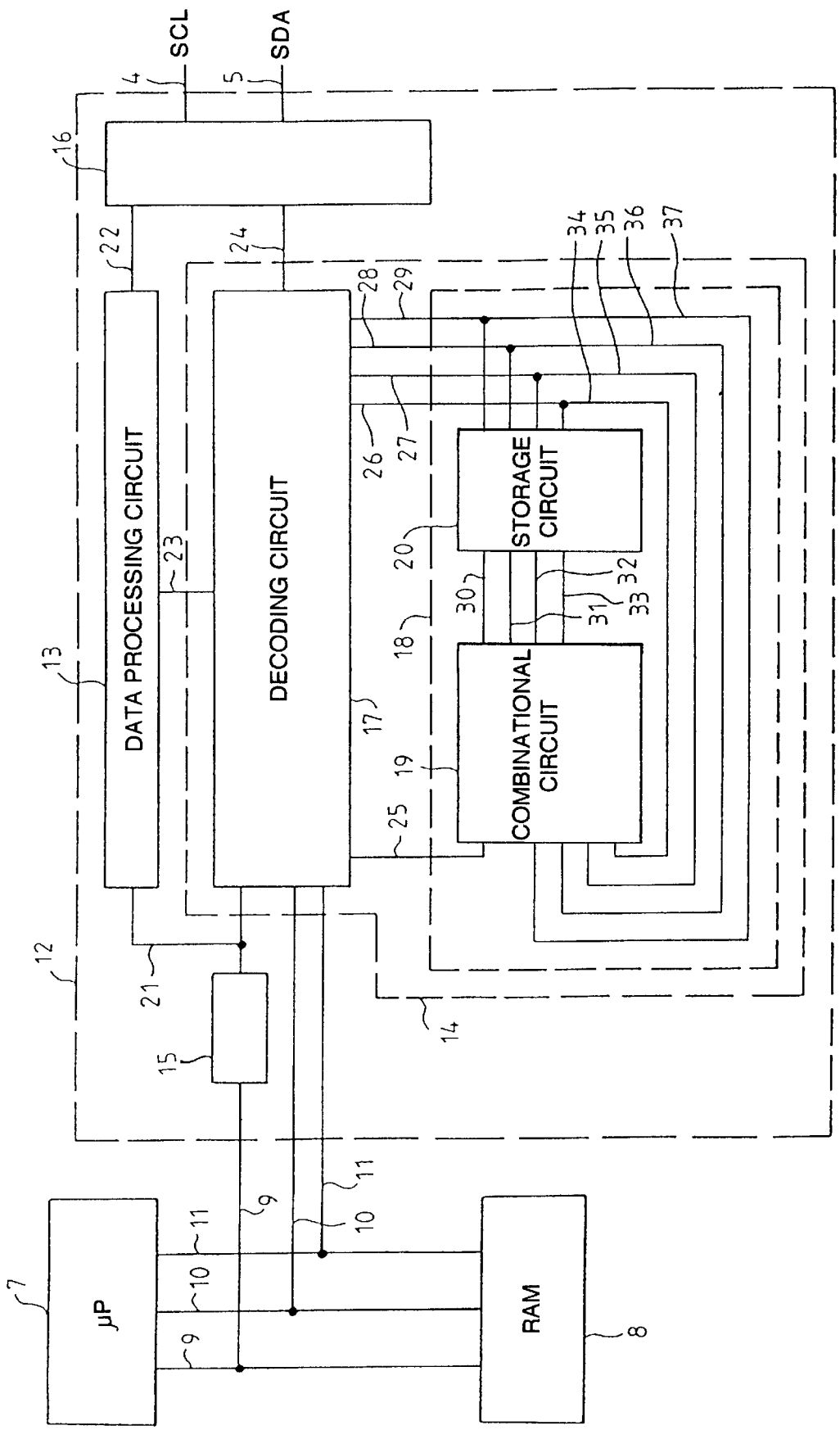
FIG_2
(PRIOR ART)

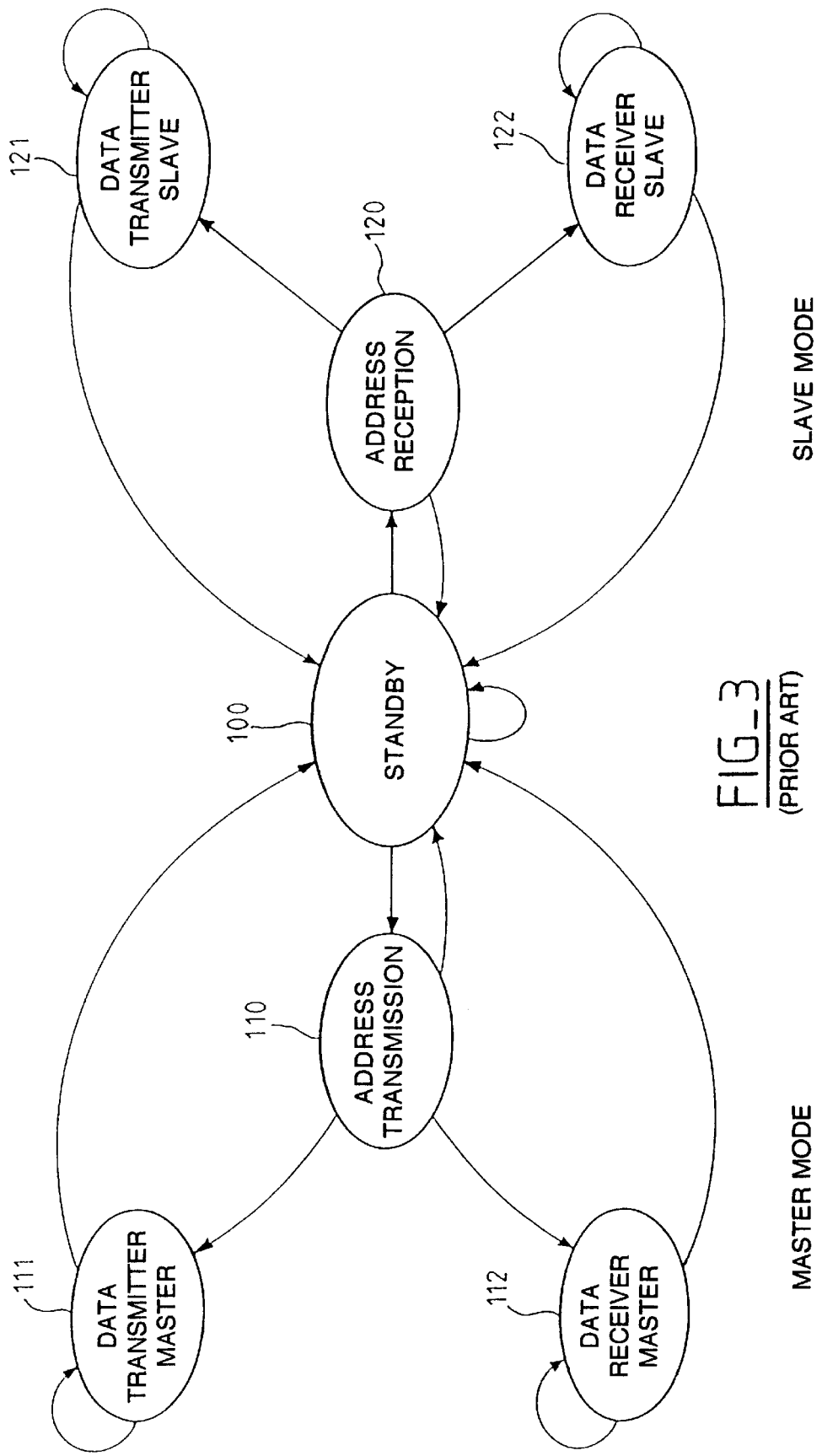
FIG_3
(PRIOR ART)

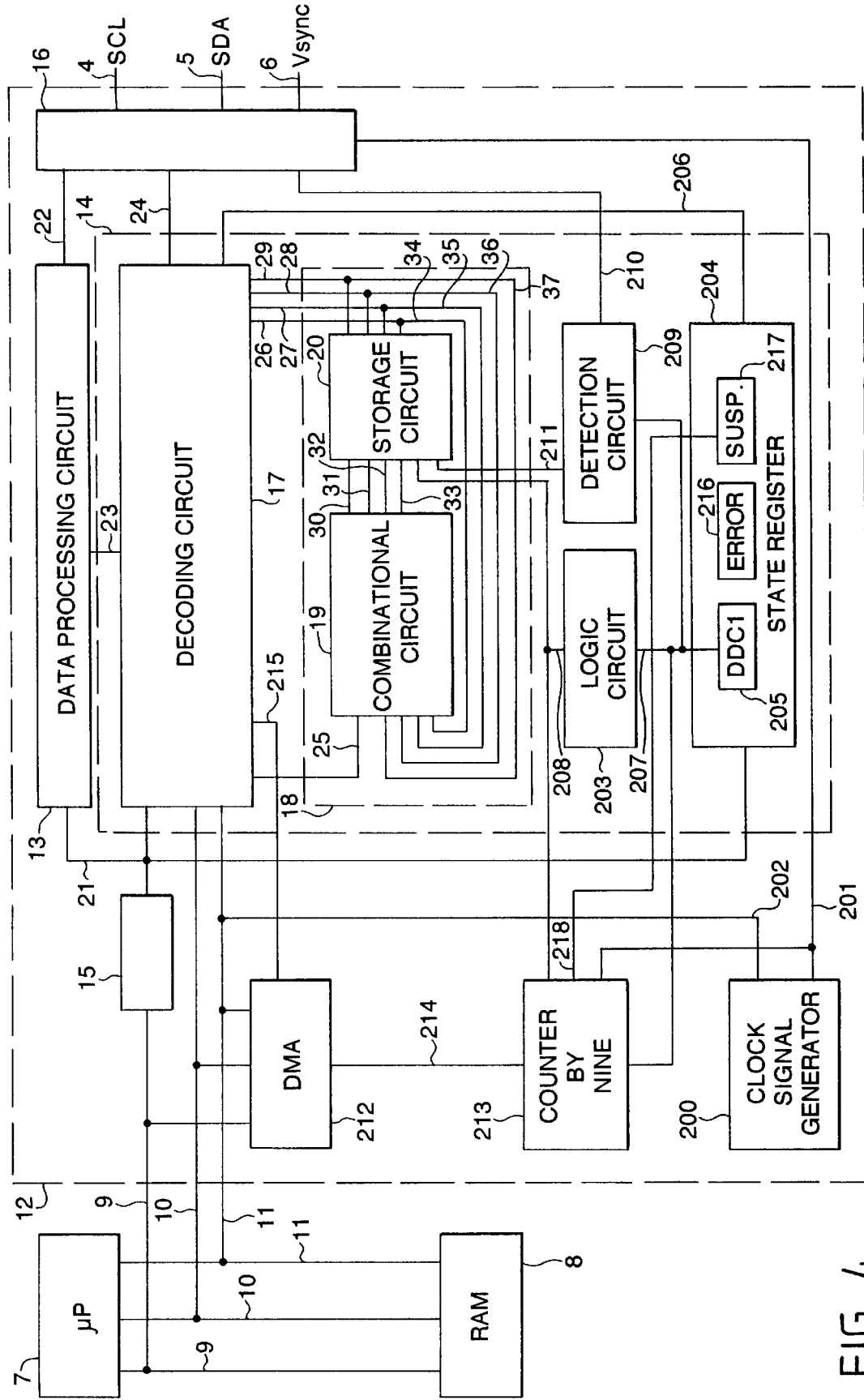
FIG_4

DEDICATED DDC INTEGRABLE MULTIMODE COMMUNICATIONS CELL

BACKGROUND OF THE INVENTION

1. Field of the Invention

The present invention relates to a DDC integrable interface cell dedicated to a microprocessor. This invention can be used especially in integrated circuits dedicated to a microprocessor to manage serial communications protocols defined by the DDC standard.

2. Discussion of the Related Art

The DDC standard of the VESA committee defines serial communications protocols. There are several communications protocols, among them DDC1, DDC2B, DDC2AB. The DDC2B and DDC2AB protocols use identical hardware communications means covered by the name I2C. By extension, the term I2C protocol shall be used hereinafter in this document to designate the protocols DDC2B and DDC2AB. The major differences between the DDC1 and I2C protocols are:

the DDC1 protocol clock is represented by a synchronous signal Vsync and the I2C protocol clock is represented by an asynchronous signal SCL, and the exchange of data elements is unidirectional for the DDC1 protocol and bidirectional for the I2C protocol.

There already exists an interface cell dedicated to the I2C protocols. This cell which permits transfers according to the DDC2B and DDC2AB protocols is used in applications of communications between a microprocessor, for example that of a microcomputer, and peripherals such as a keyboard, mouse or the like. The I2C protocols permit a transfer between two peripherals by means of a peripheral addressing system from a master to a slave. The DDC2B protocol enables a master to address one of many slaves. The DDC2AB protocol improves the system by proposing the possibility of using a multiple-master mode that authorizes several masters following the same type of exchange.

The DDC standard of the VESA committee has defined the possibility of using a DDC1 protocol simultaneously with a I2C protocol through the use of common means. However, at present, there is no interface cell enabling the simultaneous use of the DDC1 and I2C protocols. The conversion of an already existing I2C cell into a DDC1 cell is not very practical in principle, in view of the scale of the problems raised.

SUMMARY OF THE INVENTION

The invention is aimed at resolving the problem defined above. According to the invention, this problem is resolved by the use of an interface cell for a I2C protocol that will be enforced in a certain mode of operation so that it works also with the DDC1 protocol. The invention therefore relates to an interface cell of an integrated circuit, dedicated to a microprocessor, this cell comprising:

a first data input/output circuit connected to a data bus of the microprocessor, a second data input/output circuit connected to a communications network working according to at least two different protocols called the DDC1 and I2C protocols, a data processing circuit between the first data input/output circuit and the second data input/output circuit, and a control circuit comprising a sequencer, the control circuit being sequenced by the sequencer, the control circuit communicating with a control bus of the microprocessor, the control circuit also communicating with the second data input/output circuit, wherein said cell comprises a logic circuit to enforce the state of the sequencer as a function of an information element pertaining to the nature of the protocol used.

The cell thus made enables the use of the I2C and DDCI protocols. The cell is capable of changing protocol so as to be capable of alternating between the two protocols under certain conditions.

An additional characteristic of the invention lies in the use of a first state bit located in a register of the control circuit in order to inform the system of the protocol used.

The VESA committee which has defined the DDC standard furthermore stipulates that, when the DDC1 protocol is used simultaneously with the I2C protocols, it should be possible to make an automatic change-over to a I2C protocol.

The invention resolves this case of priority for the I2C protocols. With the invention, the DDC1 protocol can be abandoned by the microprocessor, but it may also be abandoned following a request signal coming from a peripheral.

In the case of the DDC1 protocol, the transmission is done synchronously. Consequently, temporal constraints appear on the bus of the microprocessor. Now, it may be that the microprocessor has to process other data elements at the time when the transfer should be done. For example, the transfer of data elements may monopolize the microprocessor for a certain period of time, and this may prove to be inconvenient if the microprocessor has to unexpectedly carry out other operations of greater importance.

According to the invention, the association of a direct memory access circuit with the DDC cell releases the microprocessor from the transfer of the data elements. All it has to do thereafter is to see to the commands for the transfer of data.

According to the invention, a control bit located in the register of the control circuit may inform the cell that the transfer of data must be suspended.

However, in direct memory access, when an error occurs in transmission, the microprocessor is not warned. This may lead to erroneous data being taken into account.

In the invention, a second state bit located in a register of the control circuit may tell the microprocessor that an error has occurred during transmission.

An embodiment of the invention is directed to a multimode communication cell capable of performing unidirectional transmissions of data according to a DDC1 protocol and bidirectional transmissions of data according to an I2C protocol, between a microprocessor and a plurality of peripherals, the cell comprising a first input/output circuit connected to a data bus of the microprocessor; a second input/output circuit having a data line and first and second clock lines, each coupled to the plurality of peripherals; a data processing circuit coupled between the first and second input/output circuits; a control circuit coupled between the first and second input/output circuits; and means for switching the transmissions between the DDC1 protocol and the I2C protocol. The switching means may comprise a state register including a first state bit which determines by which of the protocols data is transmitted. The first clock line may correspond to the I2C protocol, the second clock line may correspond to the DDC1 protocol and the first state bit may be set by the microprocessor. When the first state bit is set to a first level, the DDC1 protocol is used, and when the first state bit is set to a second level, the I2C protocol is used.

The switching means may further comprise a detection circuit coupled to the first clock line through the second input/output circuit, and when the first state bit is at the first level and the cell is transmitting data according to the DDC1 protocol, the detection circuit detects if a signal on the first clock line transitions to the second level, indicating that one of the plurality of peripherals wishes to transmit data to the microprocessor according to the I2C protocol, and instructs the switching means to interrupt the transmission according to the DDC1 protocol and to proceed with the transmission of data from the one of the plurality of peripherals to the microprocessor according to the I2C protocol. If the microprocessor changes the first state bit from the first level to the second level, the switching means switches the communication cell from the DDCI protocol to the I2C protocol after the transmission according to the DDC1 protocol is complete. The control circuit may further comprise a direct memory access circuit which, when the microprocessor is performing tasks having a higher priority than the transmission of data, performs transmissions of data in place of the microprocessor.

Another embodiment of the invention is directed to a communication system comprising a microprocessor, and interface cell and a plurality of peripherals, wherein the interface cell transmits data between the microprocessor and the peripherals according to both a DDC1 protocol and an I2C protocol. The interface cell may comprise a first input/output circuit coupled to the microprocessor, a second input/output circuit having first and second clock lines corresponding to the I2C and DDC1 protocols, respectively, and a data line, the data line and first and second clock lines being coupled to each of the plurality of peripherals and a control circuit coupled between the first and second input/output circuits, which switches transmissions of data between the DDC1 protocol and the I2C protocol. The control circuit may comprise a state register which includes a first state bit, wherein, if the first state bit is at a first level, the system operates according to the DDC1 protocol, and if the first state bit is at a second level, the system operates according to the I2C protocol.

The control circuit further may comprise a detection circuit coupled to the first clock line through the second input/output circuit, and the detection circuit detects a state of a signal on the first clock line. When the first state bit is set at the first level, and the system is transmitting data according to the DDC1 protocol, if the detection circuit detects a transition of the signal on the first clock line to the second level, indicating that one of the plurality of peripherals is ready to send a transmission to the microprocessor, the transmission according to the DDC1 protocol is interrupted, and the control circuit switches the system to the I2C protocol for the transmission between the one of the peripherals and the microprocessor. If the microprocessor changes the state bit from the first level to the second level, during a transmission according to the DDC1 protocol, the control circuit switches transmissions of data from the DDC1 protocol to the I2C protocol after the transmission according to the DDC1 protocol is complete.

Another embodiment of the invention is directed to a method of transmitting data according to a DDC1 protocol and a I2C protocol between a microprocessor and a plurality of peripherals, the method comprising performing transmissions of data from the microprocessor to the plurality of peripherals according to the DDC1 protocol; monitoring a signal from each of the plurality of peripherals; upon a transition of the signal from one of the plurality of peripherals to a low level, interrupting the transmissions according to the DDC1 protocol; and performing transmissions of data between the microprocessor and the one of the plurality of peripherals according to the I2C protocol. The method may further comprise monitoring a protocol change signal from the microprocessor; upon a transition in the protocol change signal from the microprocessor, waiting for the transmission according to the DDC1 protocol to cease; and performing transmissions of data between the microprocessor and the plurality of peripherals according to the I2C protocol. The method may further comprise flagging errors in the transmissions and suspending the transmissions when errors are flagged.

BRIEF DESCRIPTION OF THE DRAWINGS

Other features and advantages of the invention shall appear from the following description, made with reference to the appended drawings, given purely by way of example, wherein:

FIG. 1 shows a communications network functioning according to the DDC1, DDC2B and DDC2AB protocols;

FIG. 2 shows a master system comprising a microprocessor with its memory and a detailed communications cell I2C according to the prior art;

FIG. 3 shows a simplified state machine representing the main states of the sequencer according to the prior art;

FIG. 4 shows a master system comprising a microprocessor with its memory and a detailed DDC communications cell according to the invention.

DETAILED DESCRIPTION

The DDC1 protocol works with a synchronous clock whose signal Vsync is applied to a first communications wire.

The I2C protocols work with an asynchronous clock whose signal SCL (serial clock) is applied to a second communications wire.

All the protocols use a data wire to convey the signal SDA (serial DATA).

In the links of the interface cell with the communications network, the protocols of the DDC standard use open drain or open collector type connections with a pull-up resistor. Thus, when any one of the elements connected to this network decides to set a line at zero, the line is set at zero.

The DDC1 protocol has a single master and works as follows:
 the master of the communications network continually sends out a clock signal Vsync on the first communications wire;
 the master and the slaves are configured as soon as the voltage is turned on in a defined state, and the master is either a transmitter or a receiver;
 the data elements are sent at a rate set by the signal Vsync: the transmitter sends eight bits and then the receiver sends an acknowledgment bit and the process starts again.

In the case being referred to here, the master, namely the interface cell of the invention, is a transmitter and sends a cyclical message carried on the SDA signal wire.

The I2C protocols work differently. A master sends a message formed by a seven-bit address to address a slave and an eighth bit to tell the slave whether it should place itself in receiver mode or transmitter mode. In the DDC2B protocol, the network has only one master whereas, in the DDC2AB protocol, the network can take several masters. The present description of the invention shall deal with the DDC2AB case which includes the DDC2B case. The signal SCL is produced by that one of the masters that starts the transmission.

The DDC2AB protocol runs as follows:

1—At the outset, no transmission is occurring and the signal SCL is in the high state (VCC);

2—A master begins transmitting. It enforces the signal SDA at the low state (OV), and then the signal SCL at the high state. This corresponds to a start of transmission (the other elements connected to this network detect this situation and go into a standby state);

3—The master that has begun transmitting sends seven data bits on the data wire carrying the signal SDA, these seven bits corresponding to a peripheral address on the network, followed by an eighth data bit which indicates the mode of transmission or reception in which the peripheral should be placed. Each data bit must be in a valid state on a leading edge and a high state of SCL. The master continues to produce the synchronization signal SCL throughout the period of the transmission;

4—The peripheral that has recognized its address sends a low state on the signal SDA. This low state must be valid at the time of the next leading edge of SCL;

5—The transmission then takes place on nine cycles of the signal SCL, as follows:

T1—The transmitter sends eight bits on SDA validated on the leading edges of SCL,;

T2—The receiver sends a low state on SDA validated on a leading edge of SCL,

T3—Return to T1;

6—The transmission ends when the transmitter makes the signal SDA go from a low level to a high level during a high state of the signal SCL. The master then stops the transmission of the signal SCL which remains at the high level, the signal SDA also remaining at the high level.

The fact of using open drains or open collectors to pilot the lines of the network enables a slower peripheral to hold SCL at zero for a period of time that enables it to assimilate the data element of SDA. This has the effect of slowing down the transmission and making a faster element wait during a transmission.

Should several masters wish to transmit data simultaneously, it may happen that two masters will send the start-of-transmission signal at the same time. There is conflict when these two instances of the network are taken over simultaneously. The two masters therefore send the address of a different peripheral together. The first one of these masters that perceives that the bit transmitted is a zero bit rather than the one bit that it wished to transmit, stops acting as a network master. This master which has just lost control continues to decode the address that was transmitted and behaves like a slave.

In the definition of the DDC standard, the possibility of using the DDC1 protocol simultaneously with a I2C protocol dictates the automatic relinquishment of the DDC1 protocol for a I2C protocol as soon as the signal SCL is set at zero.

A network operating according to these three protocols is described in FIG. 1.

The network of FIG. 1 has a master system 1 containing a microprocessor 7 and a cell 12 constituting the object of the invention, a first peripheral 2 and a second peripheral 3. These three elements are connected together by means of a first line 4 bearing the signal SCL, a second line 5 bearing the signal SDA, a third line 6 bearing the signal Vsync.

Before describing a master system 1 working according to the DDC1 and I2C protocols, it is preferable to start with a master system comprising a communications cell working according to the I2C protocol such as exists in the prior art.

FIG. 2 gives a detailed and more precise view of the master system in the prior art. A microprocessor 7 is connected to a memory 8 by means of a data bus 9, an address bus 10 and a control bus 11. Among all the elements dedicated to the processor 7, only one communications cell 12 according to the protocol I2C has been taken into account.

The cell 12 has a data processing circuit 13 that tranforms the data elements from a word format (in parallel) into a string of bits (in series) or vice versa, a command circuit 14, a first data input/output circuit 15 and a second data input/output circuit 16.

The command circuit 14 comprises a decoding circuit 17 and a sequencer 18.

The sequencer 18 has a combinational circuit 19 and a storage circuit 20.

The processing circuit 13 is connected to the first circuit 15 by a first internal bus 21. The processing circuit 13 is connected to the second circuit 16 by wire 22. The processing circuit 13 is connected to the decoding circuit 17 by means of a second internal bus 23.

The decoding circuit 17 is connected to the microprocessor 7 by means of the control bus 11 and the address bus 10. The decoding circuit 17 is connected to the first circuit 15 by the first internal bus 21. The decoding circuit 17 is connected to the second circuit 16 by an output bus 24. The decoding circuit 17 is connected to the combinational circuit 19 by means of a control bus 25. The decoding circuit 17 also has four state wires 26, 27, 28, 29.

The first data input/output circuit 15 is also connected to the microprocessor 7 by means of the data bus 9.

The second data input/output circuit 16 is, in the prior art, connected to the communications network on the communications wires 4 and 5 bearing the signals SCL and SDA, respectively.

The output of the combinational circuit 19 is connected to the input of the storage circuit 20 by four next state wires 30, 31, 32, 33.

The output of the storage circuit 20 is connected to the input of the combinational circuit 19 by four current state wires 34, 35, 36, 37.

The four current state wires 34 to 37 are respectively connected to the four state wires 26 to 29. The number of state wires may vary without basically changing the working of the cell 12.

The decoding circuit 17 sends and receives signals to and from the different elements forming the master system 1. It has internal registers that enable interfacing with the microprocessor 7. It also has highly complex combinational logic circuits which, as a function of the incoming signals, can be used to prepare the signals to be sent to the entire cell. These signals, which are of a known type, shall be described hereinafter only when they can add clarity to the description of the other elements.

The processing circuit 13 comprises chiefly a shift register with a three-state parallel output which, by means of the second internal bus 23, will receive either a parallel loading signal, a parallel unloading signal, an outgoing shift signal or an incoming shift signal. In the case of the parallel loading signal, the data elements present at the first circuit 15 will be loaded into the register. In the case of the parallel unloading signal, the parallel output of the register will be activated so that the first circuit 15 can recover the data elements. In the case of an outgoing shift, the most significant bit of a byte residing in the register will be sent to the second circuit 16, the other bits will be shifted towards the immediately higher place values, and the least significant bit will be shifted to the most significant bit by means of a loop so as not to lose the data before the end of the transmission of the byte. In the case of an incoming shift, the bits will be shifted towards the immediately higher place value and the least significant bit will load the bit present into the second data input/output circuit 16.

To simplify the description, the first data input/output circuit 15 sets up a direct link or a high impedance state between the data bus 9 and the first internal bus 21 depending on whether or not a coupling of these buses is desired.

The second data input/output circuit 16 connects the system to the communications network. This second circuit 16 is formed by two ports. One of these ports acts either as the data output or the data input on the first communications wire 4 conveying the signal SCL. The other port carries out the checking or non-checking of the second communications wire 5 bearing the signal SDA. The state in which each port works is directly controlled by the decoding circuit 17 by means of the output bus 24.

The sequencer 18 has a combinational circuit 19 carrying out logic equations and a storage circuit 20 provided with four D type flip-flop circuits. Sequencer 18 informs the decoding circuit 17 about its state of transmission and changes its state as a function of the state in which it is and as a function of internal parameters that are given to it by means of the control bus 25. FIG. 3 gives a simplified view of the state machine that is formed by the sequencer.

The state machine of the sequencer corresponds to a state machine of the DDC2AB protocol, for the DDC2B protocol is a limitation of the DDC2AB protocol. Since giving full details of the state machine will add nothing to the description, this description shall be confined to that of a simplified state machine whence the notion of a macro-state corresponds to a grouping of states.

The initial state is the standby state 100. This state is maintained so long as there is no message to be transmitted or so long as no message is received.

If it is desired to send a message, the decoding circuit 17 sends a signal by means of the control bus 25 which places the sequencer in master mode and makes it go into the address transmission macro-state 110. This macro-state 110 places the following in sequence: the transmission of an address (namely it will enable the sending of seven address bits to a peripheral), the transmitter or receiver mode of operation of the peripheral and the wait for a zero on the line SDA corresponding to the acknowledgment from the peripheral. During this macro-state, the different conflicts among several masters are also managed. In the event of conflict, the sequencer 18 assumes the state corresponding to the address reception 120 in slave mode.

The decoding circuit 17 will transmit the acknowledgment and the mode chosen for the transmission. This is what makes the sequencer 18 go into the data transmitter master macro-state 111 or data receiver master macro-state 112.

The transmission macro-state which is the data transmitter master macro-state 111 or data receiver master macro-state 112 overlaps the transmission of the eight bits and the transmission of the acknowledgment. The transmission macro-state loops onto itself so long as the decoding circuit 17 does not inform the sequencer 18 about the end of transmission. When the sequence 18 is informed about the end of transmission, it positions itself again in the standby state 100.

If the decoding circuit 17 detects the start of a transmission on the second data input/output circuit 16, it makes the sequencer 18 go into the address reception macro-state 120, corresponding to the slave mode. This macro-state will place the entire reception of the address and of the operating mode bit in sequence. If the decoding circuit 17 does not recognize the address as being that of the cell 12, it informs the sequencer 18 that it is going back into the standby state 100. Otherwise, the sequencer 18 continues by sending the address reception acknowledgment bit.

Depending on the transmission mode received, the decoding circuit 17 will say whether the sequencer must pass into a transmitter slave macro-state 121 or a receiver slave macro-state 122.

The transmission macro-state, namely the transmitter slave macro-state 121 or receiver slave macro-state 122, covers the transmission of the eight bits and the transmission of the acknowledgment. The transmission macro-state loops onto itself so long as the decoding circuit 17 does not inform the sequencer 18 about the end of transmission. When the sequencer 18 is informed about the end of transmission, it repositions itself in the standby state 100. The data elements received or sent make use of the memory 8 of the microprocessor 7. The decoding circuit 17 will therefore send a task interruption signal to the microprocessor 7 by means of the control bus 11. Pending the transfer by the microprocessor 7 between the cell 12 and its memory 8, the decoding circuit 17 will send a signal to the second data input/output circuit 16 so that the second data input/output circuit 16 will hold the line SCL 4 at zero.

This is the point at which the prior art stops.

To enable the desired function to be obtained, it was necessary to add other elements as can be seen in FIG. 4.

A connection has been added between the signal Vsync 6 of the communications network and the second data input/output circuit 16 of the cell 12.

A clock signal generator 200 has been added to the cell 12. This clock signal generator 200 is connected, on the one hand, by a clock wire 201 to the second data input/output circuit 16 and, on the other hand, by a tapping wire 202 to the control bus 11 of the microprocessor 7. The tapping wire 202 removes the clock signal of the microprocessor 7 from the control bus 11. In one example, the generator 200 will use the frequency of the clock signal of the microprocessor 7 to produce a clock signal at 25 kHz that will be transmitted to the second data input/output circuit 16. This second data input/output circuit 16 uses this clock signal at 25 kHz by connecting it directly to the line of the signal Vsync.

A logic circuit 203 and a state register 204 containing at least one state bit 205 have been added into the command circuit 14. The state register 204 is connected to the first data input/output circuit 15 by means of the first internal bus 21 and to the decoding circuit 17 by means of a third internal bus 206. The flip-flop circuit of the state register 204 containing the first state bit 205 is connected to the logic circuit 203 by means of a first state wire 207. The logic circuit 203 is also connected to the storage circuit 20 of the sequencer 18 by means of a first enforcing wire 208.

The first state bit 205 informs the cell 12 of the protocol to be used. If the first state bit 205 is at 1, the protocol is DDC1. Else, it is an I2C protocol. As soon as the first state bit 205 goes from 0 to 1, the logic circuit 203 sends a pulse on the first enforcing wire 208 which has the effect of asynchronously enforcing the D type flip-flop circuits of the storage circuit 20 in a state that corresponds, in the simplified state machine of the sequencer 18, to the slave mode data transmission macro-state 121. In this transmission mode, the cell 12 produces no synchronization of SCL and only transmits the data elements sent to it by the microprocessor 7. In order that the microprocessor 7 may give data elements synchronously with Vsync, the decoding circuit 17 produces an interruption on the control bus 11 of the microprocessor 7. The microprocessor 7 must then see to the transfer of data elements from its memory 8 up to the cell 12. It will be observed that in this case the cell cannot wait, for there is no possibility of slowing down Vsync whereas in I2C, it is possible to make SCL wait. In other words, the microprocessor 7 must be fast enough to free itself from the task in progress and carry out the transfer.

The first state bit 205 can be dictated only by an action of the microprocessor 7 which decides to make the cell 12 work in the DDC1 protocol. So long as the first state bit 205, also called a DDC1 bit, is activated at a level 1, the sequencer 18 remains off in the transmitter slave mode 121.

The VESA committee has stipulated, in order that the I2C protocols may have priority over the DDC1 protocol, that the passing of the signal SCL to a low state will entail passing into the I2C protocols.

A detection circuit 209 is added for this function. The detection circuit 209 is connected to the second data input/output circuit 16 by means of a detection wire 210. The detection circuit 209 is connected to the storage circuit 20 by means of a second enforcing wire 211. The detection circuit 209 is also connected to a flip-flop circuit of the state register 204 containing the first state register 205 by means of the first state wire 207.

In the second data input/output circuit 16, the detection wire 210 is connected to the first communications wire 4 bearing the signal SCL. The detection circuit 209 produces a positive pulse on the second enforcing wire 211 if the line SCL 4 has a trailing edge while the first state bit 205 is at 1. The effect of the second enforcing wire 211 on the storage circuit 20 is that it forces the sequencer 18 to go into a standby state 100. The message being transmitted with the protocol DDC1 therein is interrupted without waiting for the end of a transmission.

However, when the microprocessor 7 resets the first state bit 205 at zero, the transmission is completed at the end of the byte being transmitted. The sequencer then positions itself in a standby state.

It has been seen here above that, during a transmission, the cell 12 asks the microprocessor 7 to carry out transfers of data with the memory. In the case of the DDC1 protocol, the transfer must be done without waiting because it is not possible to slow down the clock Vsync. In order that the microprocessor 7 may make the transfer, it should first of all place the task in progress on standby. This may cause a delay in the transmission.

In order to overcome this problem, the invention uses a direct memory access circuit 212 and a counter by nine 213 added into the cell 12. The DMA circuit 212 is connected to the microprocessor 7 by means of the data bus 9, the address bus 10 and the control bus 11. The DMA circuit 212 is connected to the counter 213 by means of a first priority wire 214. The DMA circuit 212 is connected to the decoding circuit 17 by means of a second priority wire 215. The counter 213 is connected to the clock signal generator 200 by means of the clock wire 201. The counter 213 is connected to the logic circuit 203 by means of the first enforcing wire 208. The counter 213 is connected to the flip-flop circuit of the state register 204 which contains the first state bit 205 by means of the first state wire 207.

The DMA circuit 212 replaces the microprocessor 7 for the transfers of data between the cell 12 and the memory 8.

In the case of the DDC1 protocol, the microprocessor 7 informs the DMA circuit 212 of the position in the memory 8 of the data elements to be transmitted. In other words, the microprocessor 7 will send the DMA circuit 212 the start-of-message address and the length of the message by means of the data bus 9. The counter 213 is reset during the passage into DDC1 mode by means of the first enforcing wire 208. The first state wire 207 permits the counting of this counter 213. The counter 213 counts the number of clock pulses on the clock wire 201. Every nine pulses, the counter by nine 213 sends a pulse on the first priority wire 214. The DMA circuit 212 receives the pulse from the first priority wire 214 and positions a transfer interruption signal on the control bus 11 of the microprocessor 7. This transfer interruption signal will place all the outputs of the microprocessor in a state of high impedance. The DMA circuit 212 then sends the memory 8 signals on the address bus 10 and control bus 11 that carry out the transfer of data elements with the cell. Once the transfer is over, the DMA circuit 212 repositions the transfer interruption signal on the control bus 11 in normal mode and the microprocessor 7 resumes control over the address bus 10 and control bus 11.

In the case of I2C protocols, it is also useful to be able to assist the microprocessor 7. This makes it possible, firstly, not to slow down the transmission and, secondly, to slow down the task in progress on the microprocessor 7 to a lesser extent. This is why, during operation in the I2C protocol, the decoding circuit 17 of the invention sends a pulse to the second priority wire 215 instead of sending a task interruption signal on the control bus 11. The DMA circuit 212 will process this pulse coming from the second priority wire 215 in the same way as an information element coming from the first priority wire 214. So long as the cell 12 works in the I2C protocol, the counter 213 is inhibited by the first state wire 207.

The circuit described here above does not detect the errors due to a transmission defect. In order to prevent the use of erroneous data elements, the cell 12 has a second state bit 216 in the state register 204. This second state bit 216 is accessible, for the microprocessor 7, by the data bus 9, the first data input/output circuit 15 and the first internal bus 21. This second state bit 216 is also accessible to the decoding circuit 17 by means of the third internal bus 206.

The second state bit 216 is enforced immediately when a physical error is detected by the cell 12. Since the error may be due to a disconnected wire, for example, it can be detected by the observation of aberrations in the transmission protocol or by the absence of an acknowledgment response within a maximum period of time. The microprocessor 7 may consult the state register 204 which contains the second state bit 216 in order to obtain information on the validity of a transmission.

In the case of a transmission error, it is not necessary to continue the data transfer. Furthermore, the microprocessor 7 may have data transfers possessing a degree of priority greater than that of the transfers required by the cell.

In order to resolve this problem, it is planned to use one control bit 217 which is also placed in the state register 204. The value of this control bit 217 may be dictated by the microprocessor 7 by means of the data bus 9, the first data input/output circuit 15 and first internal bus 21. This control bit 217 is also capable of being positioned by the decoding circuit 17 by means of the third internal bus 206. This control bit is also connected to the counter 213 by means of a second state wire 218.

When this control bit 217 is active, all the data transfers with the memory 8 must be suspended. The counter 213 is then inhibited and the decoding circuit 17 no longer requires any transfer of data unless the control bit 217 is activated.

The second state bit 216 and the control bit 217 may be identified in order to increase the integration capacity.

Having this described at least on illustrative embodiment of the invention, various alteration, modifications and improvements will readily occur to those skille din the art. Such alterations, modifications, and improvements are intended to be within the spririt and scope of the invention. Accordingly, the foregoing description is by way of example only and is not intended as limiting. The invention is limited only as defined in the following claims and the equivalents thereto.

What is claimed is:

1. An interface cell of an integrated circuit dedicated to a microprocessor, the cell comprising:
   a first data input/output circuit connected to a data bus of the microprocessor,
   a second data input/output circuit connected to a communications network working according to at least two different protocols,
   a data processing circuit connected between the first data input/output circuit and the second data input/output circuit, and
   a control circuit provided with a sequencer, the control circuit being managed by the sequencer, the control circuit communicating with a control bus of the microprocessor and with the second data input/output circuit,
   wherein said control circuit comprises a logic circuit that determines a state of the sequencer in response to an information element said information element identifying which of said protocols is being used.

2. The cell according to claim 1, wherein the information element is represented by a first state bit contained in a state register of the control circuit, and the determination of the state of the sequencer during operation of first of said protocols results from a setting of the first state bit at a first level by the microprocessor.

3. The cell according to claim 2, wherein the determination of the state of the sequencer during operation of second of said protocols results from a setting of the first state bit at a second level, the first state bit being set to a second level either by a signal coming from the communications network by means of the second data input/output circuit, or by the microprocessor.

4. The cell according to claim 3, comprising a direct memory access to manage a memory of the microprocessor in place of the microprocessor during transfers of data between the cell and the memory.

5. The cell according to claim 4, wherein the control circuit comprises, in said state register, a second state bit that reports a detection of an error.

6. The cell according to claim 4, wherein the control circuit comprises, in said state register, a control bit that suspends a transfer of data.

7. The cell according to claim 5, wherein the control circuit comprises, in said state register, a control bit that suspends a transfer of data.

8. The cell according to claim 1, further comprising:
   a clock signal generator operatively connected to second/ input output circuit and the microprocessor, wherein the clock signal generator transmits a clock signal to the second data input/output circuit; and
   a counter operatively connected to the direct memory access, the clock signal generator, and the control circuit, wherein the counter is reset upon passage into operation of first of said protocols, the counter sending a pulse to the direct memory access every nine clock pulses during operation of first of said protocols.

9. A multi-mode communication cell capable of performing unidirectional transmissions of data according to a DDC1 protocol and bidirectional transmissions of data according to an I2C protocol, between a microprocessor and a plurality of peripherals, the cell comprising:
   a first input/output circuit connected to a data bus of the microprocessor;
   a second input/output circuit having a data line and first and second clock lines, each coupled to said plurality of peripherals;
   a data processing circuit coupled between said first and second input/output circuits;
   a control circuit coupled between said first and second input/output circuits; and
   means for switching said transmissions between said DDC1 protocol and said I2C protocol.

10. The communication cell of claim 9, wherein said switching means comprises a state register including a first state bit which determines by which of said protocols data is transmitted.

11. The communication cell of claim 10, wherein said first clock line corresponds to said I2C protocol and said second clock line corresponds to said DDC1 protocol.

12. The communication cell of claim 11, wherein said first state bit is set by said microprocessor.

13. The communication cell of claim 12, wherein when said first state bit is set to a first level, said DDC1 protocol is used, and when said first state bit is set to a second level, said I2C protocol is used.

14. The communication cell of claim 13, wherein said switching means further comprises a detection circuit coupled to said first clock line through said second input/output circuit, and wherein, when said first state bit is at said first level and said cell is transmitting data according to said DDC1 protocol, said detection circuit detects if a signal on said first clock line transitions to said second level, indicating that one of said plurality of peripherals wishes to transmit data to said microprocessor according to said I2C protocol, and instructs said switching means to interrupt the transmission according to said DDC1 protocol and to proceed with the transmission of data from said one of said plurality of peripherals to said microprocessor according to said I2C protocol.

15. The communication cell of claim 14, wherein if said microprocessor changes said first state bit from said first level to said second level, said switching means switches said communication cell from said DDC1 protocol to said I2C protocol after said transmission according to said DDC1 protocol is complete.

16. The communication cell of claim 9, wherein said control circuit further comprises a direct memory access circuit which, when said microprocessor is performing tasks having a higher priority than the transmission of data, performs transmissions of data in place of the microprocessor.

17. The communication cell of claim 11, wherein said state register further includes a second state bit which flags an occurrence of an error in said transmission.

18. The communication cell of claim 11, wherein said state register further comprises a control bit which, when active, suspends transmissions of data.

19. The communication cell of claim 9, further comprising:
   a clock signal generator operatively connected to second/ input output circuit and the microprocessor, wherein the clock signal generator transmits a clock signal to the second data input/output circuit; and
   a counter operatively connected to the direct memory access, the clock signal generator, and the control circuit, wherein the counter is reset upon passage into operation of said DDC1 protocol, the counter sending a pulse to the direct memory access every nine clock pulses during operation of said DDC1 protocol.

20. A communication system comprising a microprocessor, and interface cell and a plurality of peripherals, wherein said interface cell transmits data between said microprocessor and said peripherals according to both a DDC1 protocol and an I2C protocol.

21. The system of claim 20, wherein said interface cell comprises:
   a first input/output circuit coupled to said microprocessor, a second input/output circuit having first and second clock lines corresponding to said I2C and DDC1 protocols, respectively, and a data line, said data line and first and second clock lines being coupled to each of said plurality of peripherals; and
   a control circuit coupled between said first and second input/output circuits, which switches transmissions of data between said DDC1 protocol and said I2C protocol.

22. The system of claim 21, wherein said control circuit comprises a state register which includes a first state bit, wherein, if said first state bit is at a first level, said system operates according to said DDC1 protocol, and if said first state bit is at a second level, said system operates according to said I2C protocol.

23. The system of claim 22, wherein said first state bit is set by said microprocessor.

24. The system of claim 23, wherein said control circuit further comprises a detection circuit coupled to said first clock line through said second input/output circuit, and wherein said detection circuit detects a state of a signal on said first clock line.

25. The system of claim 24, wherein when said first state bit is set at said first level, and said system is transmitting data according to said DDC1 protocol, if said detection circuits detects a transition of said signal on said first clock line to said second level, indicating that one of said plurality of peripherals is ready to send a transmission to said microprocessor, said transmission according to said DDC1 protocol is interrupted, and said control circuit switches said system to said I2C protocol for the transmission between said one of said peripherals and said microprocessor.

26. The system of claim 24, wherein if said microprocessor changes said first state bit from said first level to said second level, during a transmission according to said DDC1 protocol, said control circuit switches transmissions of data from said DDC1 protocol to said I2C protocol after said transmission according to said DDC1 protocol is complete.

27. The system of claim 21, wherein said control circuit further comprises a direct memory access circuit which performs transmissions of data in place of the microprocessor when the microprocessor is performing other tasks.

28. The system of claim 27, further comprising:
   a clock signal generator operatively connected to second/input output circuit and the microprocessor, wherein the clock signal generator transmits a clock signal to the second data input/output circuit; and
   a counter operatively connected to the direct memory access, the clock signal generator, and the control circuit, wherein the counter is reset upon passage into operation of said DDC1 protocol, the counter sending a pulse to the direct memory access every nine clock pulses during operation of said DDC1 protocol.

29. The system of claim 22, wherein said state register further comprises a second state bit which flags an occurrence of an error in said transmission.

30. The system of claim 22, wherein said state register further comprises a control bit which, when active, suspends transmission of data.

31. A method of transmitting data according to a DDC1 protocol and a I2C protocol between a microprocessor and a plurality of peripherals, the method comprising:
   performing transmissions of data from said microprocessor to said plurality of peripherals according to said DDC1 protocol;
   monitoring a signal from each of said plurality of peripherals;
   upon a transition of said signal from one of said plurality of peripherals to a low level, interrupting said transmissions according to said DDC1 protocol; and
   performing transmissions of data between said microprocessor and said one of said plurality of peripherals according to said I2C protocol.

32. The method of claim 31, further comprising:
   monitoring a protocol change signal from said microprocessor;
   upon a transition in said protocol change signal from said microprocessor, waiting for said transmission according to said DDC1 protocol to cease; and
   performing transmissions of data between said microprocessor and said plurality of peripherals according to said I2C protocol.

33. The method of claim 32, further comprising flagging errors in said transmissions.

34. The method of claim 33, further comprising suspending said transmissions when errors are flagged.

* * * * *